(12) United States Patent
Nakayama

(10) Patent No.: US 6,791,849 B2
(45) Date of Patent: Sep. 14, 2004

(54) SYNCHRONOUS RECTIFYING CIRCUIT FOR FLYBACK CONVERTER

(75) Inventor: Kazuaki Nakayama, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/394,149

(22) Filed: Mar. 24, 2003

(65) Prior Publication Data

US 2003/0193820 A1 Oct. 16, 2003

(30) Foreign Application Priority Data

Mar. 29, 2002 (JP) .................................... P2002-094276

(51) Int. Cl.$^7$ ............................................ H02M 3/335
(52) U.S. Cl. ................................... 363/21.14; 363/127
(58) Field of Search ........................ 363/16, 21.01, 363/21.06, 21.14, 21.16, 21.17, 125, 127

(56) References Cited

U.S. PATENT DOCUMENTS 5,343,383 A * 8/1994 Shinada et al. ............. 363/127
6,038,148 A * 3/2000 Farrington et al. ........ 363/21.06
6,061,255 A * 5/2000 Chik et al. ................ 363/21.06

FOREIGN PATENT DOCUMENTS

| JP | 9-172775 | 6/1997 |
| JP | 2002-10639 | 1/2002 |

* cited by examiner

*Primary Examiner*—Jessica Han
(74) *Attorney, Agent, or Firm*—Sughrue Mion, PLLC (57) ABSTRACT

A synchronous rectifying circuit for a flyback converter includes a synchronous rectifying element ($Q_2$) coupled to the secondary winding ($N_2$) of a transformer (T) and performing a synchronous rectifying operation according to an on/off operation of the synchronous rectifying element; an auxiliary inductance circuit ($L_3$) coupled to the secondary winding ($N_2$) of the transformer (T) and having an energy discharge time period shorter than that of the secondary winding ($N_2$); and a control element ($Q_3$) for turning the synchronous rectifying element ($Q_2$) off in response to the detection of termination of the energy discharge of the auxiliary inductance circuit ($L_3$).

8 Claims, 6 Drawing Sheets

SYNCHRONOUS RECTIFYING CIRCUIT FOR FLYBACK CONVERTER

The present disclosure relates to the subject matter contained in Japanese Patent Application No. 2002-094276 filed on Mar. 29, 2002, which is incorporated herein by reference in its entirety.

BACKGROUND OF THE INVENTION

1. Field of the Invention

The present invention relates to a synchronous rectifying circuit, which is a kind of switching regulators, for a flyback converter.

2. Description of the Related Art

Conventionally, in a switching regulator, a synchronous rectifying circuit is known as a rectifying circuit for attaining a high efficiency. On one hand, a self-excited type flyback converter, often referred to as the ringing choke converter (RCC), which is a kind of switching regulators is most cheap among the switching regulators of about 50 watt or less, and so employed widely in an AC adapter etc. The synchronous rectifying circuit has been tried to be applied to such a self-excited type flyback converter in various manners, but sufficient effects have not been obtained. The reason why it is difficult to apply the synchronous rectifying circuit to the self-excited type flyback converter is that it is difficult to detect the turn-off timing of a rectifying diode in addition to that the switching frequency changes largely depending on amount of a load to be coupled.

In particular, in the ZVS (zero volt switching) utilizing the resonance with the leakage inductance of a transformer which has been performed recently in the switching of the primary side, the slope of reduction of a voltage from the time point near the turning-off of a rectifying diode is gentle, so that it has been increasingly difficult to apply the synchronous rectifying circuit.

Also, when a synchronous rectifying transistor is turned on at the time of turning the rectifying diode off, a large reverse pulse current flows. Thus, not only efficiency is degraded but also the synchronous rectifying transistor is broken at the worst.

In the meantime, various kinds of synchronous rectifying circuits each using a current transformer has been proposed. Examples are disclosed in U.S. Pat. No. 3,066,727 and JP-A-2002-10639.

The synchronous rectifying circuit of the current transformer type is configured to control the switching operation of a synchronous rectifying transistor by a voltage generated at a secondary winding in accordance with an output current flowing through the primary winding of the current transformer.

However, the aforesaid conventional synchronous rectifying circuit has the following drawbacks. (1) Considerable amount of a consumption of electric power by the current transformer. (2) The high price of the current transformer itself. (3) Large amount of the switching loss caused by the slow switching speed to an off state due to the gate input capacitance of the synchronous rectifying transistor, and by the moderate curvature of the increase/decrease rate of a voltage generated at the secondary winding of the current transformer. (4) Incapability of a wide range load due to the inability to switch the synchronous rectifying transistor when the load is small and the voltage level itself generated at the secondary winding of the current transformer becomes low.

SUMMARY OF THE INVENTION

The invention was made in view of such a conventional circumference and an object of the invention is to provide a synchronous rectifying circuit for a flyback converter which can eliminate the drawbacks of the current transformer type, that is, a synchronous rectifying circuit for a flyback converter which is high in efficiency, cheap and can cope with a wide range load.

In order to achieve the above object, according to a first aspect of the invention, there is provided a synchronous rectifying circuit for a flyback converter, including: a transformer having a primary winding and a secondary winding; a synchronous rectifying element coupled to the secondary winding of the transformer and performs a synchronous rectifying operation by turning on and off; an auxiliary inductance circuit coupled to the secondary winding of the transformer and has shorter energy discharge time period in comparison with the secondary winding; and a control element for turning off the synchronous rectifying element when a termination of energy discharge of the auxiliary inductance circuit is detected.

According to the synchronous rectifying circuit for a flyback converter thus configured, the circuit can be configured so as to be small in the voltage loss and also low in the cost (almost ¹⁄₁₀ of the cost of the synchronous rectifying circuit using the current transformer). Further, since the auxiliary inductance circuit shorter in the energy discharge time period than that of the secondary winding of the transformer is employed and the termination of the energy discharge of the auxiliary inductance circuit is detected by the control element thereby to turn the synchronous rectifying element off, the switching loss can be made small.

According to a second aspect of the invention, in arrangement of the synchronous rectifying circuit in the aforesaid first aspect, the synchronous rectifying element includes a field effect transistor; and the control element turns off the synchronous rectifying element by discharging electric charges accumulated in a gate of the field effect transistor.

In this configuration, since the termination of the energy discharge of the auxiliary inductance circuit is detected by the control element thereby to discharge the electric charges accumulated in the gate of the field effect transistor and turn the field effect transistor off, the switching loss can be made small.

According to a third aspect of the invention, in arrangement of the synchronous rectifying circuit in the aforesaid first or second aspect, the transformer has an auxiliary winding extending from the second winding, and further including an isolation diode element coupled between the auxiliary winding and the auxiliary inductance circuit.

In this configuration, at the time of turning-on of the synchronous rectifying element by the auxiliary inductance circuit, reminder of the energy is regenerated to the auxiliary winding through the isolation diode element.

According to a fourth aspect of the invention, in arrangement of the synchronous rectifying circuit in the aforesaid third aspect, may further include a control element coupled to the auxiliary winding and turns on the synchronous rectifying element.

In this configuration, the synchronous rectifying element is turned on by the control element coupled to the auxiliary winding.

According to a fifth aspect of the invention, in arrangement of the synchronous rectifying circuit in the aforesaid first or second aspect, may further include a control element coupled to the secondary winding and turns on the synchronous rectifying element.

In this configuration, the synchronous rectifying element is turned on by the control element coupled to the secondary winding.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
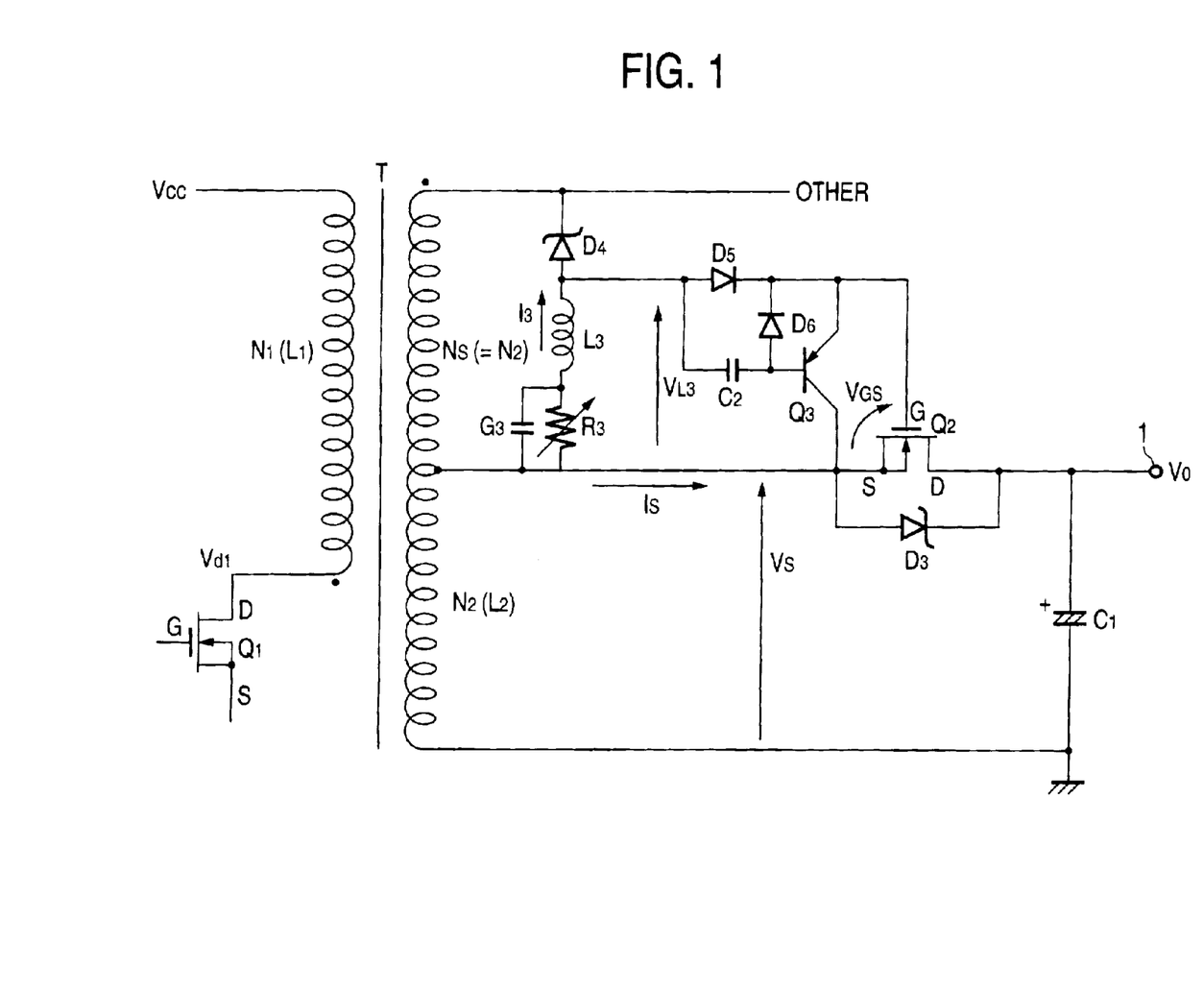
FIG. 1 is a circuit diagram showing a synchronous rectifying circuit for a flyback converter according to a first embodiment of the invention.

Referring now to the accompanying drawings, there are shown preferred embodiments of the invention.
First Embodiment:

FIG. 1 is a circuit diagram showing a synchronous rectifying circuit for a flyback converter according to a first embodiment of the invention. In the primary side of a transformer T, a power supply voltage $V_{CC}$ is supplied to the one terminal of a primary winding $N_1$ (having an inductance $L_1$) and a drain of a switching transistor (N channel type MOS field effect transistor) $Q_1$ is coupled to the other terminal of the primary winding. On the other hand, in a secondary side of the transformer T, one terminal of a secondary winding $N_2$ (having an inductance $L_2$) is grounded, whilst one end of a coil $L_3$ constituting an auxiliary inductance circuit is coupled to the other terminal of the secondary winding through a parallel arrangement of a capacitor $C_3$ and a variable resistor $R_3$, and also a source of a transistor (N channel type MOS field effect transistor) $Q_2$ which is a synchronous rectifying element for performing the synchronous rectifying through an ON/OFF operation is coupled to the other terminal of the secondary winding. The coil $L_3$ is shorter in an energy discharge period than the secondary winding $N_2$. In this respect, irrespective of size relation between the inductance of the coil $L_3$ and the inductance of the secondary winding $N_2$, an energy discharge time period as an auxiliary inductance circuit is preferably shorter than an energy discharge time period of the secondary winding $N_2$. A drain of the transistor $Q_2$ is grounded through a smoothing electrolytic capacitor $C_1$ and also coupled to an output terminal 1 for supplying an output voltage $V_o$. A Schottky diode $D_3$ serving as a rectifying auxiliary diode is coupled between the source and the drain of the transistor $Q_2$.

An auxiliary winding $N_s$ is provided so as to be extended from the secondary winding $N_2$. That is, the one terminal of the auxiliary winding $N_s$ (the number of the winding is equal to that of the secondary winding $N_2$ in this embodiment) is coupled to the other terminal of the secondary winding $N_2$. A Schottky diode $D_4$ serving as an isolation diode element is coupled between the other terminal of the auxiliary winding $N_s$ and the other end of the coil $L_3$. The other terminal of the auxiliary winding Ns can be used for other power supply. A coupling point between the Schottky diode $D_4$ and the coil $L_3$ is coupled to the gate of the transistor $Q_2$ through a counter-current blocking diode $D_5$. The gate of the transistor Q2 is coupled to an emitter of a transistor (PNP transistor) $Q_3$ serving as a control element for turning off the synchronous rectifying transistor $Q_2$, whilst the collector of the transistor $Q_3$ is coupled to the source of the transistor $Q_2$. Further, a coupling point between the Schottky diode $D_4$ and the coil $L_3$ is coupled to the base of the transistor $Q_3$ through a differentiating capacitor $C_2$. A protection diode $D_6$ is coupled between the base and the emitter of the transistor $Q_3$. The transistor $Q_3$ serves to detect the termination of an energy discharge of the coil $L_3$ thereby to turn the transistor $Q_2$ off. An output terminal 1 is coupled to the gate of the transistor $Q_1$ through a control circuit (not shown) for controlling the switching operation of the transistor $Q_1$ on the primary side in accordance with a change of the output voltage $V_o$.

Figure 2A:
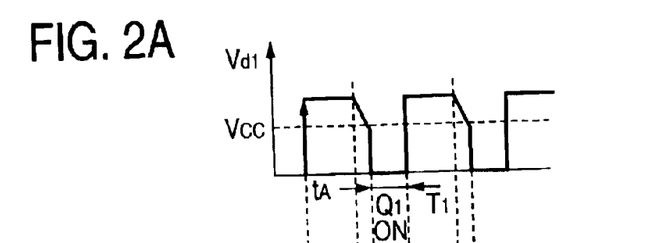
FIGS. 2A to 2F are waveform diagrams showing the operation of the synchronous rectifying circuit according to the first embodiment of the invention.
Figure 2B:
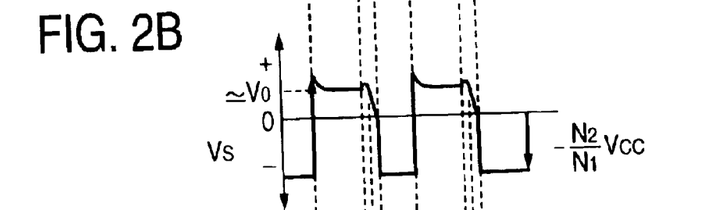
Figure 2C:
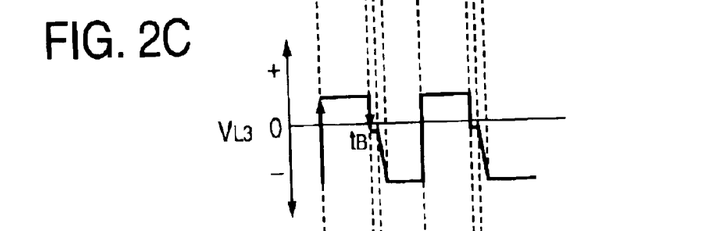
Figure 2D:
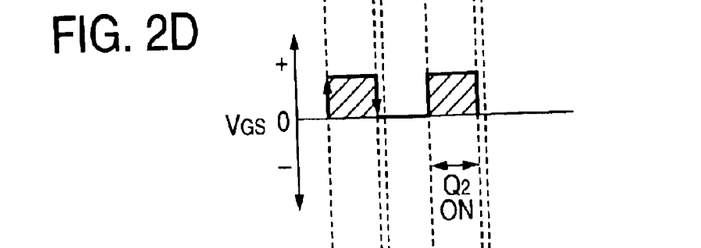
Figure 2E:
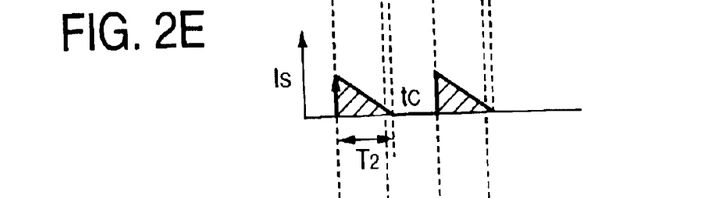
Figure 2F:
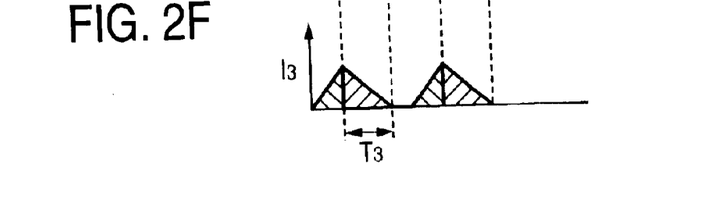

Next, the operation of the synchronous rectifying circuit according to the embodiment configured in this manner will be explained. First, explanation will be made as to the switching of the transistor $Q_2$ from an off state to an on state. When the drain voltage $V_{d1}$ of the switching transistor $Q_1$ raises at a time point $t_A$ as shown in FIG. 2A, the source voltage $V_s$ of the synchronous rectifying transistor $Q_2$ rises as shown in FIG. 2B. Thus, a voltage $V_{L3}$ generated across a series circuit configured by the coil $L_3$ and the parallel arrangement of the capacitor $C_3$ and the variable resistor $R_3$ rises as shown in FIG. 2C. When the voltage $V_{L3}$ rises, a part of electric charges caused by the energy discharge of the coil $L_3$ is applied to the gate of the transistor $Q_2$ through the diode $D_5$, whereby a voltage $V_{GS}$ between the gate and the source of the transistor $Q_2$ rises quickly as shown in FIG. 2D thereby to turn the transistor $Q_2$ on. Although a current Is flowing into the transistor $Q_2$ and the Schottky diode $D_3$ rises at the time point $t_A$ as shown in FIG. 2E, this current decreases gradually thereafter. A current $I_3$ flowing through the coil $L_3$ decreases gradually after the time point $t_A$ (a energy discharge time period $T_3$ of the coil $L_3$) as shown in FIG. 2F.

Subsequently, explanation will be made as to the switching of the transistor $Q_2$ from an off state to an on state. When the voltage $V_{L3}$ generated across the series circuit configured by the coil $L_3$ and the parallel arrangement of the capacitor $C_3$ and the variable resistor $R_3$ falls at a time point $t_B$ simultaneously with the termination of the energy discharge of the coil $L_3$ as shown in FIG. 2C, the transistor $Q_2$ is turned on. Thus, the electric charges accumulated in the gate of the transistor $Q_2$ is discharged through the emitter and the collector of the transistor $Q_3$, whereby the voltage $V_{GS}$ between the gate and the source of the transistor $Q_2$ falls quickly as shown in FIG. 2D, thereby to turn the transistor $Q_2$ off. That is, the termination of the energy discharge of the coil $L_3$ is detected by the transistor $Q_3$ and then the transistor $Q_2$ is turned off. Although the current $I_3$ flowing through the coil $L_3$ becomes 0 at the time point $t_B$ as shown in FIG. 2F, the current $I_s$ flowing into the Schottky diode $D_3$ becomes 0 at a time point $t_C$ later than the time point $t_B$ as shown in FIG.

2E. This is because the energy discharge time period $T_3$ of the coil $L_3$ is shorter than an energy discharge time period $T_2$ of the secondary winding $N_2$ of the transformer T.

Next, the reason why a relation that the energy discharge time period $T_3$ is shorter than the energy discharge time period $T_2$ ($T_3 < T_2$) is always satisfied will be explained by using expressions. First, energy $P_1$ accumulated in the primary winding $N_1$ (inductance $L_1$) of the transformer T at the moment that the switching transistor $Q_1$ is changed from an on state to an off state is represented by the following expression (1);

$$P_1 = (\tfrac{1}{2})(V_{cc}^2/L_1)T_1^2 \tag{1}$$

where $T_1$ represents an ON time period of the transistor $Q_1$. When the energy $P_1$ is seen from the secondary side of the transformer T, the energy $P_1$ is equal to energy P2 accumulated in the secondary winding $N_2$ (inductance $L_2$) and $L_2 = (N_2/N_1)^2 L_1$. Thus, the energy $P_1$ is represented by the following expression (2).

$$P_1 = P_2 = (\tfrac{1}{2})(1/L_2)\{(N_2/N_1)V_{cc}\}^2 T_1^2 \tag{2}$$

Similarly, the energy $P_3$ accumulated in the coil $L_3$ (inductance $L_3$) is represented by the following expression (3);

$$P_3 = (\tfrac{1}{2})(1/L_3)\{(N_s/N_1)V_{cc} - \Delta V\}^2 T_1^2 \tag{3}$$

where $\Delta V$ represents the total of the forward voltage $V_F$ of the Schottky diode $D_4$, a voltage between both the terminals of the variable resistor $R_3$ and the voltage drop across the winding resistance of the coil $L_3$. A part of the energy $P_3$ is supplied as electric charges to the gate of the synchronous rectifying transistor $Q_2$ through the diode $D_5$ thereby to turn the transistor $Q_2$ on. The reminder of the accumulated energy is regenerated to the auxiliary winding $N_s$ through the Schottky diode $D_4$. Thus, energy required for turning the transistor $Q_2$ on can be made minimum.

Next, the energy discharge time period $T_2$ of the secondary winding $N_2$ and the energy discharge time period $T_3$ of the coil $L_3$ will be obtained. The ON resistance value of the transistor $Q_2$ is sufficiently small. Thus, if such an ON resistance is ignored, the voltage between both the terminals of the secondary winding $N_2$ is equal to the output voltage Vo and the energy $P_2$ is equal to the discharge energy of the secondary winding $N_2$, and so the energy $P_2$ is represented by the following expression (4).

$$P_2 = (1/2)(1/L_2)\{(N_2/N_1)V_{cc}\}^2 T_1^2 \tag{4}$$
$$= (1/2)(1/L_2)V_o^2 T_2^2$$

According to this expression (4), the energy discharge time period $T_2$ of the secondary winding $N_2$ is represented by the following expression (5).

$$T_2 = (N_2/N_1)(V_{cc}/V_o)T_1 \tag{5}$$

Similarly, since the voltage between both the terminals of the auxiliary winding $N_s$ is $(N_s/N_2)V_o$, the energy $P_3$ is represented by the following expression (6);

$$P_3 = (1/2)(1/L_3)\{(N_s/N_1)V_{cc} - \Delta V\}^2 T_1^2 \tag{6}$$
$$= (1/2)(1/L_3)\{(N_s/N_2)V_o + \Delta V\}^2 T_3^2$$

where $(N_s/N_1)V_{cc} - \Delta V$ represents an effective voltage applied to the coil $L_3$ within the ON time period $T_1$ of the transistor $Q_1$ and $(N_s/N_2)V_o + \Delta V$ represents an effective voltage generated at the coil $L_3$ within the energy discharge time period $T_3$ of the coil $L_3$. Thus, the energy discharge time period $T_3$ Of the coil $L_3$ is represented by the following expression (7).

$$T_3 = [\{(N_s/N_1)V_{cc} - \Delta V\}/\{(N_s/N_2)V_o + \Delta V\}]T_1 \tag{7}$$
$$= [\{(N_s/N_1)V_{cc} - (N_2/N_s)\Delta V\}/\{V_o + (N_2/N_s)\Delta V\}]T_1$$

And by eliminating $T_1$ using the expression (5), the energy discharge time period $T_3$ of the coil $L_3$ is represented by the following expression (8).

$$T_3 = [\{V_o - (N_1/N_s)\Delta V(V_o/V_{cc})\}/\{V_o + (N_2/N_s)\Delta V\}]T_2 \tag{8}$$
$$= [\{1 - (N_1/N_s)(\Delta V/V_{cc})\}/\{1 + (N_2/N_s)(\Delta V/V_o)\}]T_2$$

Thus, when $\Delta V$ is set to have a certain value, a relation that the energy discharge time period $T_3$ is always shorter than the energy discharge time period $T_2$ ($T_3 < T_2$) can be satisfied. However, when $\Delta V$ is 0, $T_3$ becomes equal to $T_2$.

When a load to be coupled to the output terminal 1 becomes large, the ON time period of the transistor $Q_1$ becomes longer, and so the current $I_3$ flowing through the coil $L_3$ increases. As a result, the total voltage $\Delta V$ of the forward voltage $V_F$ of the Schottky diode $D_4$, a voltage between both the terminals of the variable resistor $R_3$ and the voltage drop across the winding resistance of the coil $L_3$ also increases and the ratio between the energy discharge time periods $T_3$ and $T_2$ also changes. However, when the variable resistor $R_3$ is adjusted to adjust the voltage between both the terminals thereof, the ratio can be made almost constant, so that the synchronous rectifying can be performed in correspondence with a wide range load. In this respect, since the current $I_3$ is sufficient in a range of about 0.1 to 0.2 ampere, a small sized coil $L_3$ may be used.

Figure 3:
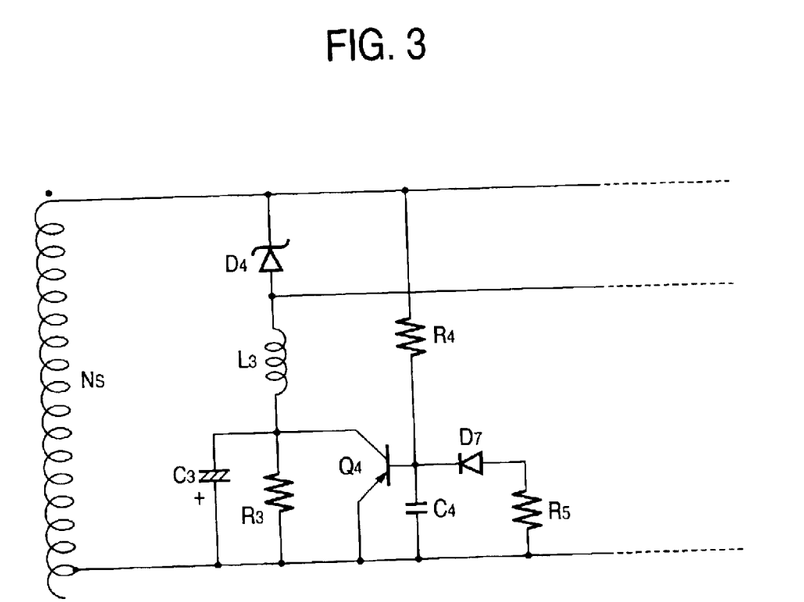
FIG. 3 is a circuit diagram showing an example of a circuit configuration for automatically adjusting a voltage between terminals of a variable resistor according to a load condition in the first embodiment of the invention.

In this respect, a circuit configuration as shown in FIG. 3 may be employed in order to automatically adjust the voltage between both the terminals of the variable resistor $R_3$ in accordance with the load condition. This circuit configuration is arranged by utilizing a fact that the switching frequency increases when the load becomes smaller in a manner that a resistor $R_3$ is used in place of the variable resistor $R_3$ (FIG. 1) and a smoothing electrolytic capacitor $C_3$ is used in place of the capacitor $C_3$ (FIG. 1). In this arrangement, the collector of the transistor (PNP transistor) $Q_4$ is coupled to the connection point between the coil $L_3$ and the resistor $R_3$ and the emitter of the transistor $Q_4$ is coupled to the one terminal of the auxiliary winding $N_s$. The base of the transistor $Q_4$ is coupled to the one terminal of the auxiliary winding $N_s$ through the capacitor $C_4$ and also through a series circuit of the diode $D_7$ and a resistor $R_5$ and also coupled to the other terminal of the auxiliary winding $N_s$ through a resistor $R_4$.

In such a circuit configuration, when a triangular wave generated by the resistor $R_4$ and the capacitor $C_4$ is supplied to the base of the transistor $Q_4$, the transistor $Q_4$ performs a PWM chopper operation. When the load becomes larger, the ON time period of the transistor $Q_4$ becomes longer, whilst when load becomes smaller, the ON time period becomes shorter. In this manner, the voltage between both the terminals of the variable resistor $R_3$ (the voltage between both the terminals of the capacitor $C_3$) can be adjusted to a desired value automatically, so that the ratio between the energy discharge time periods $T_3$ and $T_2$ can always be made almost constant. Incidentally, the temperature compensation of the transistor $Q_4$ can be performed by a diode $D_7$.

According to the synchronous rectifying circuit of this embodiment, the drawbacks caused by the current transformer having been used conventionally can be eliminated. That is, since the embodiment does not use any current transformer, the synchronous rectifying circuit of this embodiment can be configured so as to be small in the voltage loss and also low in the cost (almost 1/10 of the cost of the synchronous rectifying circuit using the current transformer). Further, since the embodiment is arranged in a manner that the coil L3 which is shorter in the energy discharge time period than that of the secondary winding N2 of the transformer T is employed and the termination of the energy discharge of the coil $L_3$ is detected by the transistor $Q_3$ thereby to turn the transistor $Q_2$ off (quickly reduce the voltage VGS between the source and the gate of the transistor $Q_2$), the switching loss can be made small. Thus, in the converter of about 30 to 50 watt, the synchronous rectifying circuit of the embodiment can improve the efficiency by about several percent when compared with the synchronous rectifying circuit using the current transformer. Further, since the embodiment is arranged to adjust the voltage between both the terminals of the resistor $R_3$ coupled to the coil $L_3$, the ratio between the energy discharge time period $T_3$ of the coil $L_3$ and the energy discharge time period $T_2$ of the secondary winding $N_2$ can be made almost constant and so the synchronous rectifying can be performed in correspondence with a wide range load.

Figure 4:
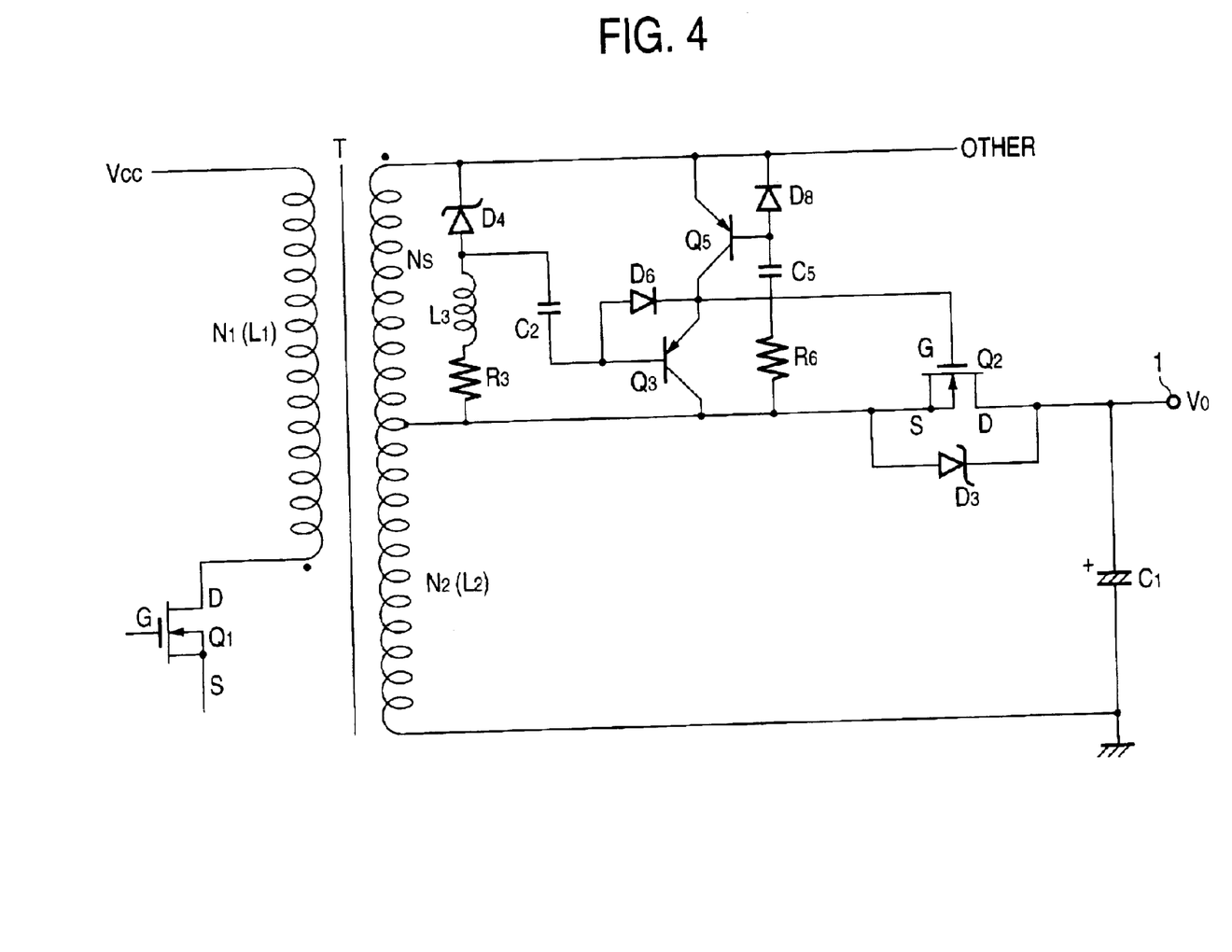
FIG. 4 is a circuit diagram showing a synchronous rectifying circuit according to a second embodiment of the invention.

Second Embodiment:

FIG. 4 is a circuit diagram showing a synchronous rectifying circuit according to a second embodiment of the invention. In the synchronous rectifying circuit according to this embodiment, a resistor $R_3$ is employed in place of the variable resistor $R_3$ (FIG. 1) and the capacitor $C_3$ (FIG. 1) is eliminated. The emitter of a transistor $Q_5$ (PNP transistor) serving as a control element for turning on the synchronous rectifying transistor $Q_2$ is coupled to the other terminal of an auxiliary winding $N_s$, and the collector of the transistor $Q_5$ is coupled to the gate of the transistor $Q_2$. The base of the transistor $Q_5$ is coupled to the one terminal of the auxiliary winding $N_s$ through a series circuit of a differential capacitor $C_5$ and a resistor R6 and also coupled to the other terminal of the auxiliary winding $N_s$ through a diode $D_8$. The remaining configuration of this embodiment is same as that of the synchronous rectifying circuit of the aforesaid first embodiment and so the explanation thereof is omitted.

In the synchronous rectifying circuit of the second embodiment configured in this manner, the transistor $Q_2$ is turned on in response to the supply of electric charges to the gate of the transistor $Q_2$ from the transistor $Q_5$. In contrast, the transistor $Q_2$ is turned off in response to the discharge of the electric charges accumulated in the gate of the transistor $Q_2$ due to the cooperation of a coil $L_3$ and a transistor $Q_3$. Incidentally, since the ON time period of each of the transistors $Q_5$ and $Q_3$ is short, these transistors are not turned on simultaneously. According to this synchronous rectifying circuit, the effects similar to those of the first embodiment can be obtained.

Figure 5:
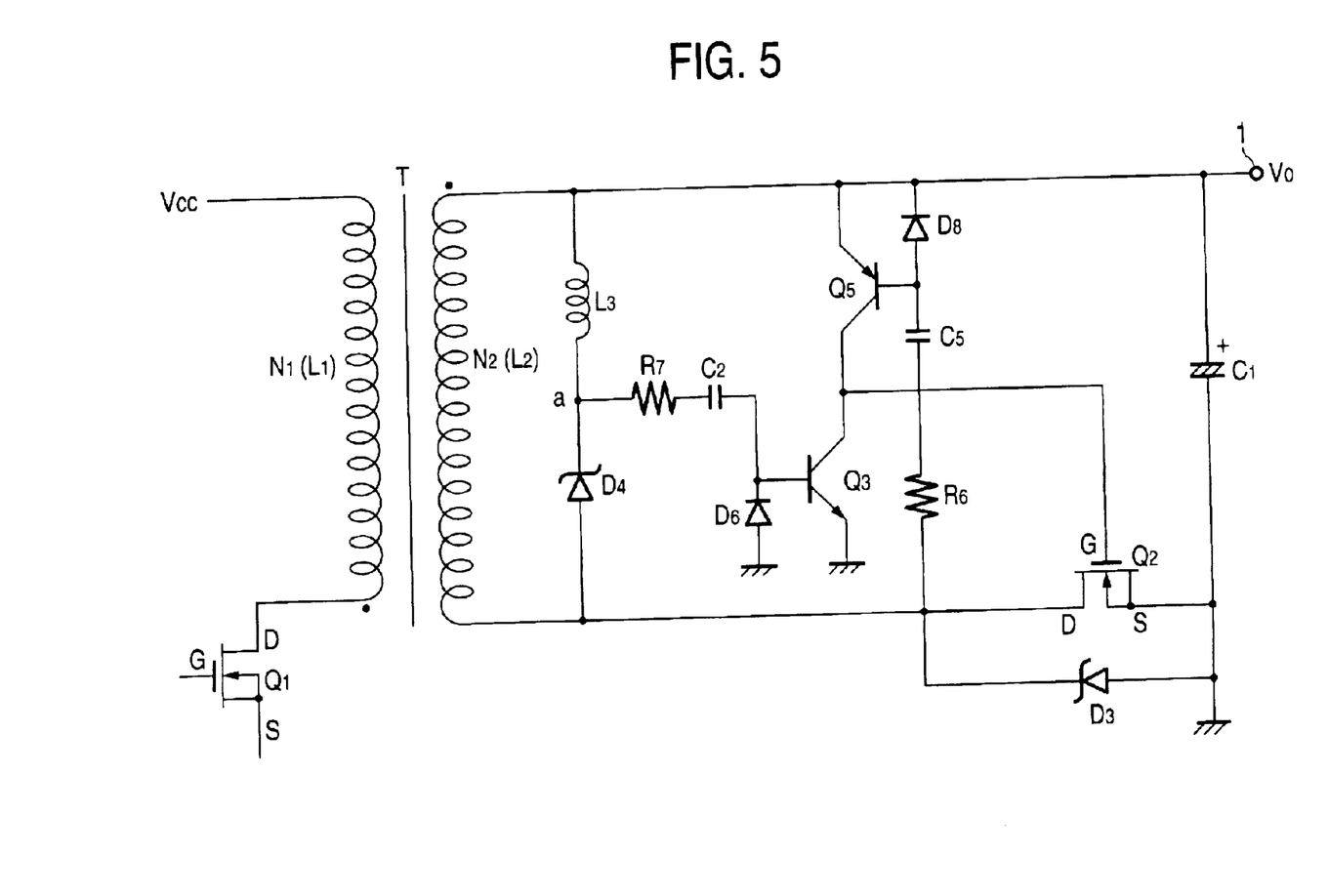
FIG. 5 is a circuit diagram showing a synchronous rectifying circuit according to a third embodiment of the invention.

Third Embodiment:

FIG. 5 is a circuit diagram showing a synchronous rectifying circuit according to a third embodiment of the invention. In the synchronous rectifying circuit according to this embodiment, the secondary winding of the transformer T is formed only by a secondary winding $N_2$ (that is, by a single winding). In the secondary side of the transformer T, the one terminal of the secondary winding $N_2$ is coupled to the anode of a Schottky diode $D_4$ and also coupled to the drain of a synchronous rectifying transistor (N channel type MOS field effect transistor) $Q_2$. The source of the transistor $Q_2$ is grounded and also coupled through a smoothing electrolytic capacitor $C_1$ to an output terminal 1 for supplying an output voltage $V_o$. A Schottky diode $D_3$ serving as a rectifying auxiliary diode is coupled between the source and the drain of the transistor $Q_2$.

On the other hand, the other terminal of the secondary winding $N_2$ is coupled to the cathode of the Schottky diode $D_4$ through a coil $L_3$ and also coupled to the output terminal 1. The emitter of a transistor $Q_5$ (PNP transistor) serving as a turning-on control element for turning the synchronous rectifying transistor $Q_2$ on is coupled to the other terminal of the secondary winding $N_2$, and the collector of the transistor $Q_5$ is coupled to the gate of the transistor $Q_2$. The base of the transistor $Q_5$ is coupled to the one terminal of the secondary winding $N_2$ through a series circuit of a differential capacitor $C_5$ and a resistor R6 and also coupled to the other terminal of the secondary winding $N_2$ through a diode $D_8$. The gate of the transistor $Q_2$ is coupled to the collector of a transistor (NPN transistor) $Q_3$ and the emitter of the transistor $Q_3$ is grounded. A coupling point a between the coil $L_3$ and the Schottky diode $D_4$ is coupled to the base of the transistor $Q_3$ through a current limiting resistor $R_7$ and the differential capacitor $C_2$. A protection diode $D_6$ is coupled between the base and the emitter of the transistor $Q_3$. The remaining configuration of this embodiment is same as that of the synchronous rectifying circuit of the aforesaid first embodiment and so the explanation thereof is omitted.

In the synchronous rectifying circuit of the second embodiment configured in this manner, the transistor $Q_2$ is turned on in response to the supply of electric charges to the gate of the transistor $Q_2$ from the transistor $Q_5$. In contrast, the transistor $Q_2$ is turned off in response to the discharge of the electric charges accumulated in the gate of the transistor $Q_2$ due to the cooperation of the coil $L_3$ and the transistor $Q_3$. That is, the transistor $Q_3$ detects the termination of the energy discharge of the coil $L_3$ (the voltage increase at the coupling point a between the coil $L_3$ and the Schottky diode $D_4$) thereby to turn the transistor $Q_2$ off. Incidentally, since the ON time period of each of the transistors $Q_5$ and $Q_3$ is short, these transistors are not turned on simultaneously. According to this synchronous rectifying circuit, the effects similar to those of the first embodiment can be obtained.

In the synchronous rectifying circuits of the first to third embodiments, a general diode with a small forward voltage may be used in place of the Schottky diode $D_4$.

Figure 6:
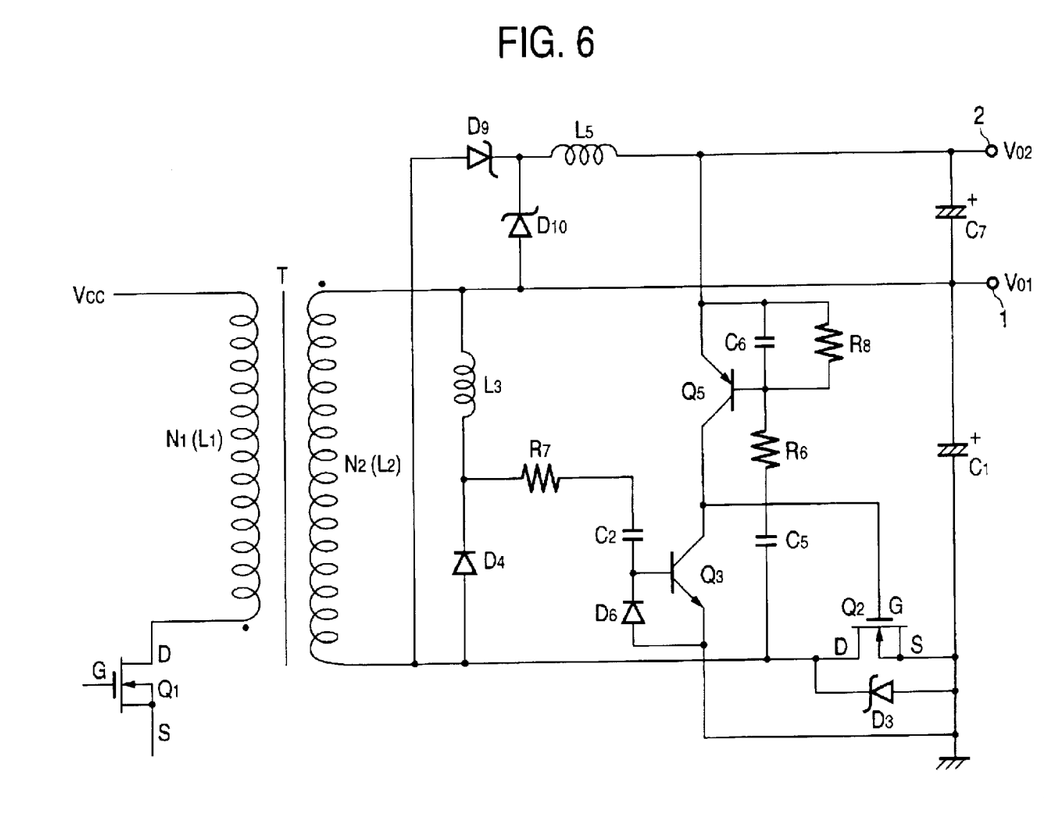
FIG. 6 is a circuit diagram showing a synchronous rectifying circuit according to a fourth embodiment of the invention.

Fourth Embodiment:

FIG. 6 is a circuit diagram showing a synchronous rectifying circuit according to a fourth embodiment of the invention. In the synchronous rectifying circuit according to this embodiment, the secondary winding of the transformer T is formed only by a secondary winding $N_2$ (that is, by a single winding) so that two output voltages $V_{o1}$ and $V_{o2}$ are taken therefrom. That is, this converter operates as a forward converter with respect to the output voltage $V_{o2}$ and as a flyback converter with respect to the output voltage $V_{o1}$. In the secondary side of a transformer T, the one terminal of the secondary winding $N_2$ is coupled through a Schottky diode $D_9$ and a coil $L_5$ to an output terminal 2 for supplying the output voltage $V_{o2}$. On the other hand, the other terminal of the secondary winding $N_2$ is coupled to a connection point between the Schottky diode $D_9$ and the coil $L_5$ through a Schottky diode $D_{10}$ and also coupled to the output terminal 2 through an electrolytic capacitor $C_7$. The emitter of a transistor $Q_5$ (PNP transistor) is coupled to a connection point between the coil $L_5$ and the output terminal 2 and the collector of the transistor $Q_5$ is coupled to the gate of a transistor $Q_2$. The base of the transistor $Q_5$ is coupled to the one terminal of the secondary winding $N_2$ through a series circuit of a resistor $R_6$ and a differential capacitor $C_5$. Each of a resistor $R_8$ and an electric charge amount limiting capacitor $C_6$ is coupled between the base and the emitter of the transistor $Q_5$. The remaining configuration of this embodiment is same as that of the synchronous rectifying circuit of the aforesaid third embodiment and so the explanation thereof is omitted.

In the synchronous rectifying circuit of this embodiment configured in this manner, the transistor $Q_2$ is turned on in response to the supply of electric charges to the gate of the transistor $Q_2$ from the transistor $Q_5$. In contrast, the transistor $Q_2$ is turned off in response to the discharge of the electric charges accumulated in the gate of the transistor $Q_2$ due to the cooperation of a coil $L_3$ and a transistor $Q_3$. Incidentally, since the ON time period of each of the transistors $Q_5$ and $Q_3$ is short, these transistors are not turned on simultaneously. According to this synchronous rectifying circuit, the effects similar to those of the first embodiment can be obtained.

Further, according to this synchronous rectifying circuit, the utilizing efficiency of the transformer T can be improved and the transformer T can be miniaturized as compared with the case of extracting the output voltage $V_{o2}$ from the auxiliary winding. Furthermore, according to the third embodiment, when the output voltage $V_o$ is low (low as 3.3 volt or 2.5 volt, for instance), there may arise a case that the gate voltage of the transistor $Q_2$ is not sufficiently high and so an ON-resistance value thereof does not reduce sufficiently. According to the synchronous rectifying circuit of this embodiment, when the transistor $Q_1$ is an ON state, the Schottky diode $D_9$ is turned on thereby to output an output voltage also serving as a high driving voltage (the output voltage $V_{o2}$), whereby such a problem can be eliminated. Of course, when the output voltage $V_o$ is used only as the driving voltage, since a current is small, both the coil $L_5$ and the Schottky diode $D_{10}$ are not required (the coil $L_5$ is replaced by a resistor) and the electrolytic capacitor $C_7$ may be one having a small capacitance. The output voltage $V_{o2}$ may be raised to $V_{o1}+(N_2/N_1)V_{cc}$ at the maximum. Incidentally, according to an experiment, the high efficiency of 90 percent or more was obtained depending on the condition.

As clear from the aforesaid explanation, according to the invention, it is possible to provide a synchronous rectifying circuit for a flyback converter provided to eliminate the drawbacks of the current transformer type, that is, a synchronous rectifying circuit for a flyback converter that is high in efficiency, cheap and can cope with a wide range load.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A synchronous rectifying circuit for a flyback converter, comprising:

a transformer having a primary winding and a secondary winding;

a synchronous rectifying element coupled to the secondary winding of the transformer and performs a synchronous rectifying operation by turning on and off;

an auxiliary inductance circuit coupled to the secondary winding of the transformer and has shorter energy discharge time period in comparison with the secondary winding; and a control element for turning off the synchronous rectifying element when a termination of energy discharge of the auxiliary inductance circuit is detected.

2. The synchronous rectifying circuit as claimed in claim 1, wherein the synchronous rectifying element comprises a field effect transistor; and the control element turns off the synchronous rectifying element by discharging electric charges accumulated in a gate of the field effect transistor.

3. The synchronous rectifying circuit as claimed in claim 2, wherein the transformer has an auxiliary winding extending from the secondary winding, further comprising:

an isolation diode element coupled between the auxiliary winding and the auxiliary inductance circuit.

4. The synchronous rectifying circuit as claimed in claim 3, further comprising:

a control element coupled to the auxiliary winding and turns on the synchronous rectifying element.

5. The synchronous rectifying circuit as claimed in claim 2, further comprising:

a control element coupled to the secondary winding and turns on the synchronous rectifying element.

6. The synchronous rectifying circuit as claimed in claim 1, wherein the transformer has an auxiliary winding extending from the secondary winding, further comprising:

an isolation diode element coupled between the auxiliary winding and the auxiliary inductance circuit.

7. The synchronous rectifying circuit as claimed in claim 6, further comprising:

a control element coupled to the auxiliary winding and turns on the synchronous rectifying element.

8. The synchronous rectifying circuit as claimed in claim 1, further comprising:

a control element coupled to the secondary winding and turns on the synchronous rectifying element.

* * * * *